United States Patent [19]
Hannewald

[11] Patent Number: 5,718,201
[45] Date of Patent: Feb. 17, 1998

[54] LOAD ADJUSTMENT DEVICE

[75] Inventor: Thomas Hannewald, Griesheim, Germany

[73] Assignee: VDO Adolf Schindling AG, Frankfurt, Germany

[21] Appl. No.: 656,588

[22] Filed: May 31, 1996

[30] Foreign Application Priority Data

May 31, 1995 [DE] Germany .......... 195 19 836.0

[51] Int. Cl.[6] .................................. F20D 11/10
[52] U.S. Cl. .................................. 123/396; 123/399
[58] Field of Search ................ 123/396, 399, 123/339.15, 400, 401, 402

[56] References Cited

U.S. PATENT DOCUMENTS

| | | | |
|---|---|---|---|
| 4,986,238 | 1/1991 | Terazawa | 123/361 |
| 5,014,666 | 5/1991 | Westernberger | 123/339 |
| 5,060,613 | 10/1991 | Lieberoth-Leden et al. | 123/399 |
| 5,148,790 | 9/1992 | Hickmann et al. | 123/399 |
| 5,297,521 | 3/1994 | Sasaki et al. | 123/396 |

FOREIGN PATENT DOCUMENTS

4134876 A1 4/1993 Germany .

Primary Examiner—Andrew M. Dolinar
Assistant Examiner—Hieu T. Vo
Attorney, Agent, or Firm—Martin A. Farber

[57] ABSTRACT

A load adjustment device for an actuator which determines the power of an internal combustion engine has a driver which is displaceable between two fixed stops which define full load and minimum load. A setting spring is so arranged that it is cocked both by the movement of the driver out of the emergency travel position into full load position, and by the movement out of the emergency travel position into the minimum load position. In this way, a single setting spring acts in such a manner that the actuator is urged from all possible positions in the direction of its emergency travel position.

7 Claims, 3 Drawing Sheets

LOAD ADJUSTMENT DEVICE

FIELD AND BACKGROUND OF THE INVENTION

The present invention relates to a load adjustment device for an actuator which determines the power of an internal combustion engine and which has a driver which is coupled with an actuator and is displaceable between two fixed stops defining full load and minimum load. The driver is urged by an emergency travel spring from the minimum-load position towards an emergency operation stop lying between the full load position and the minimum load position and by a return spring from the full load position in the direction towards the minimum load position.

Load adjustment devices of the above type are generally known under the name E-Gas for the adjustment of the power of the internal combustion engine of motor vehicles. In them, the minimum load position is so designed, in order to minimize the consumption of fuel, that the internal combustion engine still just operates uniformly upon idling. This has the result that it is not possible in the minimum load position to produce a torque which is sufficient to move the vehicle. However, this may be necessary if the vehicle must be driven out of a region of danger, but the load adjustment device can no longer be displaced by actuating the accelerator pedal due to a failure of the control electronics or of the actuating drive. For this reason, in the known load adjustment devices there is present, in addition to the return spring, an emergency travel spring which provides that, in case of failure of the control electronics or of the actuating drive, the actuator moves positively from the minimum load position into an emergency travel position in which the internal combustion engine produces a sufficiently large torque to move the vehicle at slow speed. This emergency travel position is established by a stop which can be displaced against the force of the return spring and against which the driver is urged by the emergency travel spring and which can be displaced by the driver against the force of the return spring when the driver moves out of the emergency position in the direction towards the full load position.

The emergency travel spring necessary for reaching the emergency travel position requires—aside from its cost—a corresponding amount of space and leads to an increase in the weight as compared with a load adjustment device without positive movement into an emergency travel position in the event of a defect.

SUMMARY OF THE INVENTION

It is an object of the invention so to develop a load adjustment device of the aforementioned type that it is of a construction which is as simple and compact as possible and can be produced at a cost which is as favorable as possible.

According to the invention, the return spring and the emergency travel spring are formed by a single setting spring (6) which is cocked by the movement of the driver (1) from the emergency travel position in both directions of movement.

As a result of this development, a single spring is used for two purposes, namely both for moving the driver from its minimum load position into the emergency travel position, and for moving the driver from its full load position into the emergency travel position. Therefore, a spring can be saved as compared with the known load adjustment device, which results in a reduction in cost and, in addition, reduces the space required, as well as the weight of the load adjustment device. These advantages are obtained without any decrease in the quality of operation or dependability of operation of the load adjustment device.

The double use of a single spring can take place in various manners. In one advantageous embodiment of the invention, the setting spring (6) is a compression spring which spreads two setting disks (4, 5) apart from each other. One of the setting disks (4) rests against an emergency travel stop (7), and the other setting disk (5) rests, in its position furthest from the emergency travel stop (7) against a housing (9). The driver (1) for the displacement of each of the two setting disks (4, 5) in a direction towards the other of the setting disks (4, 5), in each case grips with a setting projection (2, 3) over the outside of the setting disks (4, 5).

Both setting disks rest in each case at the same time against two stops fixed on the housing and the driver. In this way a statically undetermined system is produced. As a result of rough or unfavorable tolerances, the parts may have an undesirably large amount of play. This can be compensated for in simple manner thereby that the setting disk (5) which is on the full-load side rests against the housing in the emergency travel position, and in a region between the emergency travel position and the full load position via a set screw (8) or some other play-avoiding element, such as, for instance an eccentric.

Play between the structural parts can also be excluded entirely without a set screw which is to be adjusted if, in accordance with another particularly advantageous feature of the invention, the set spring (6) is developed for tensioning a cable (12) which is passed over a pulley (13) and extends to the driver (1) for urging the driver (1) from a minimum load stop (10) towards the emergency travel stop (7). The emergency travel stop (7) is provided on a stop part (14) which rests from the full-load side against a housing stop (15). The stop part 14 bears the pulley (13) and is arranged displaceable in the direction towards the full load position by means of the driver (1).

One embodiment of the invention which can be produced at particularly low cost results if a lever (16) is swingably pivoted on the driver (1) around a pin (17) of the driver (1). The lever is urged by the setting spring (6) in the direction towards the emergency travel stop (7), and is limited, by a lever arm (18) resting against the driver (1), in a swing relative to the driver (1) in the direction towards the emergency travel stop (7). The lever (16) rests in the emergency travel position simultaneously against the emergency travel stop (7) and the driver (1).

Frequently, in load adjustment devices, the return of the actuator is effected by a spiral spring one end of which is fastened to a holder configured as a further stop 29 which is fixed on the housing and the other end of which is fastened on the driver. Also in the case of such a load adjustment device, the movement of the actuator from its minimum load position into the emergency travel position can be obtained without an additional spring by a lever (16) mounted on the driver for swinging around the pin (17) of the driver (1). The lever rests in the emergency travel position against the holder which is fixed on the housing. The driver (1) surrounds the setting shaft (26) by a ring part (31) which has a slot (28), via which part it rests, in the emergency travel position with one end against the setting shaft (26) and which is so directed that the ring part (31), after reaching the emergency travel position, upon further movement of the driver (1) relative to the setting shaft (26), is able to move radially outward. With such a load adjustment device, upon reaching the emergency travel position and further movement of the driver in the direction towards the minimum load position, the pin of the lever moves, from a middle position, against the force of the spiral spring, increasingly towards the outside. Thereby, a force which urges the driver back to the emergency travel position is always present between the minimum load position and the emergency travel position.

A setting spring which is developed as spiral spring is reliably held in particularly simple manner in its installed position if, in accordance with another further feature of the invention, the ring part (31) has a plurality of spring-cover arms (32, 33) which grip over the setting spring (6) which is developed as spiral spring.

BRIEF DESCRIPTION OF THE DRAWINGS

With the above and other objects and advantages in view, the present invention will become more clearly understood in connection with the detailed description of preferred embodiments, when considered with the accompanying drawing, of which.

DETAILED DESCRIPTION OF THE PREFERRED EMBODIMENTS

Figure 1:
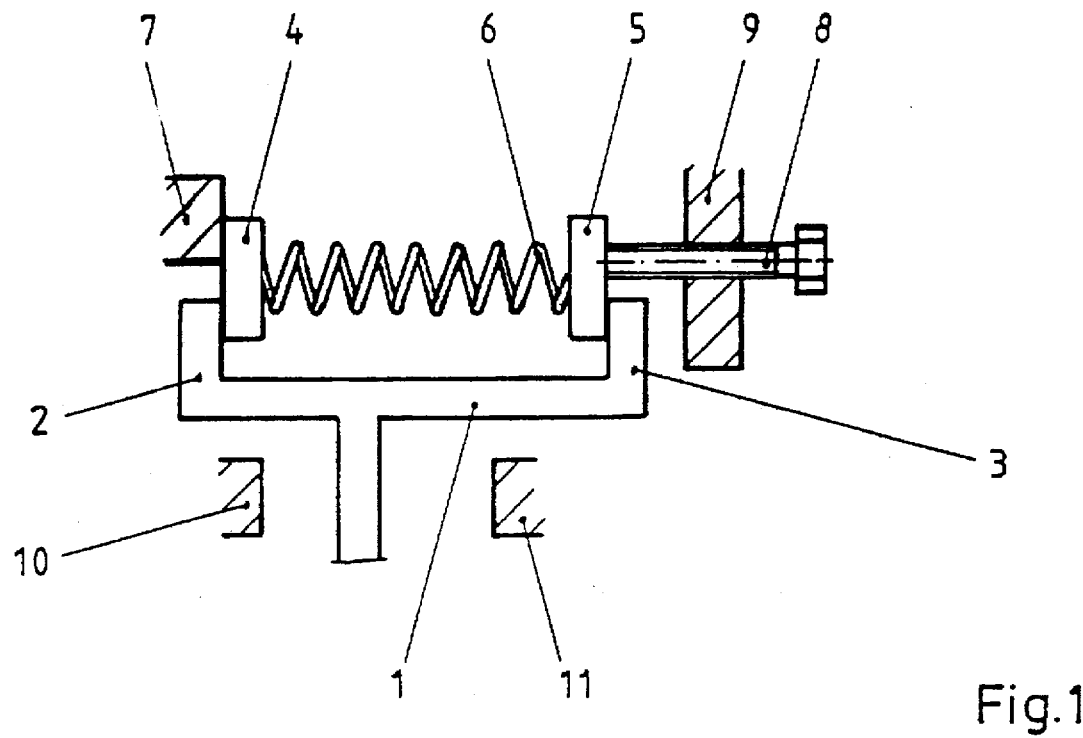
FIG. 1 is a basic sketch of a first embodiment of a load adjustment device in accordance with the invention.

FIG. 1 shows a driver 1 which serves for the displacement of an actuator such as a throttle valve (not shown in FIG. 1) and is therefore coupled in customary manner with such a throttle valve. This driver 1 is shown in its emergency travel position in FIG. 1. The driver 1 is developed in the form of a fork and has two upward directed, tine-like setting projections 2, 3, of which the setting projection 2 rests from the outside against a setting disk 4 and the setting projection 3 rests from the outside against a second setting disk 5.

Between the setting disks 4, 5 there is a setting spring 6 which is developed as compression spring, it urging the two setting disks 4, 5 away from each other. In the emergency travel position shown, the left setting disk 4 rests against an emergency travel stop 7 which is fixed on the housing, and the right setting disk 5 rests against a setting screw 8 of a housing 9.

If the driver 1 is moved to the left from the position shown until it strikes against a minimum load stop 10, then the setting projection 3 moves the setting disk 5 correspondingly to the left against the force of the setting spring 6 away from the setting screw 8. If no setting force acts any longer in the direction towards the minimum load stop 10, then the setting spring 6 presses the setting disk 5, and thus also the driver, back into the position shown.

If the driver 1 is moved to the right from the position shown to against a full load stop 11, then the setting projection 2 pushes the setting disk 4 to the right against the force of the setting spring 6. When no setting force acts any longer, this setting spring 6 pushes the driver 1 back again into the emergency travel position shown.

Figure 2:
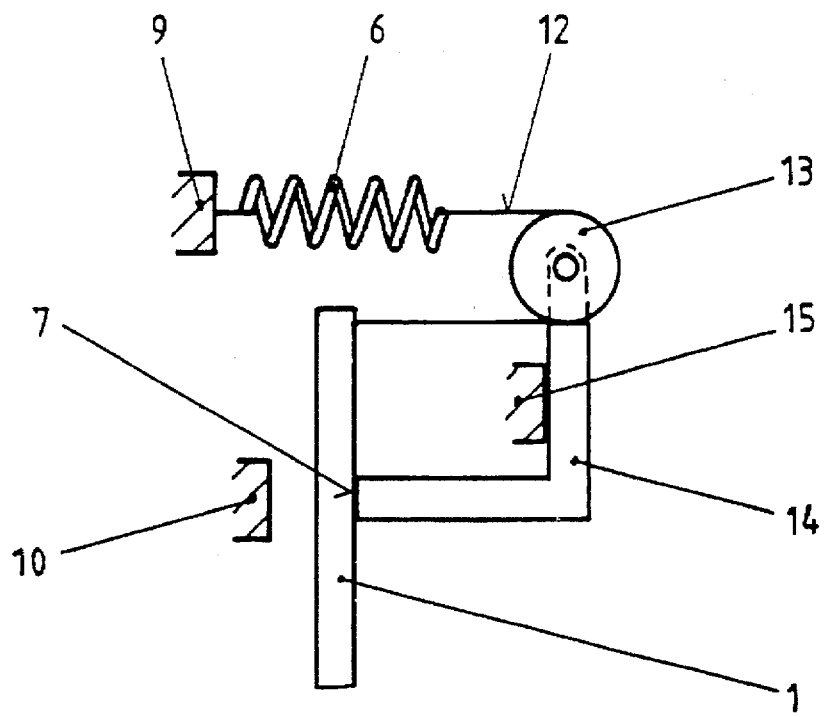
FIG. 2 is a basic sketch of a second embodiment of a load adjustment device in accordance with the invention.

In the embodiment in accordance with FIG. 2, the setting spring 6 is developed as a tension spring one end of which is fastened to the housing 9 while the other end tensions a cable 12 which leads over a pulley 13 to the driver 1. The pulley 13 is fastened on a stop part 14 which, in the emergency travel position shown, rests against a housing stop 15. On this stop part 14 there is also provided the emergency travel stop 7 against which the driver 1 rests in the position shown.

If the driver 1 moves to the right out of the position shown in the direction of the full load position, then the driver 1, via the emergency travel stop 7, pushes the stop part 14 to the right away from the housing stop 15, whereby the pulley 13 is correspondingly also moved to the right and the setting spring 6 thereby increasingly tensioned.

Upon a movement of the driver 1 to the left towards the minimum load stop 10, the stop part 14 remains stationary since it rests against the housing stop 15. Therefore, the driver-side end of the cable 12 is increasingly displaced towards the left by the driver and the setting spring 6 is thereby also tensioned.

Figure 3:
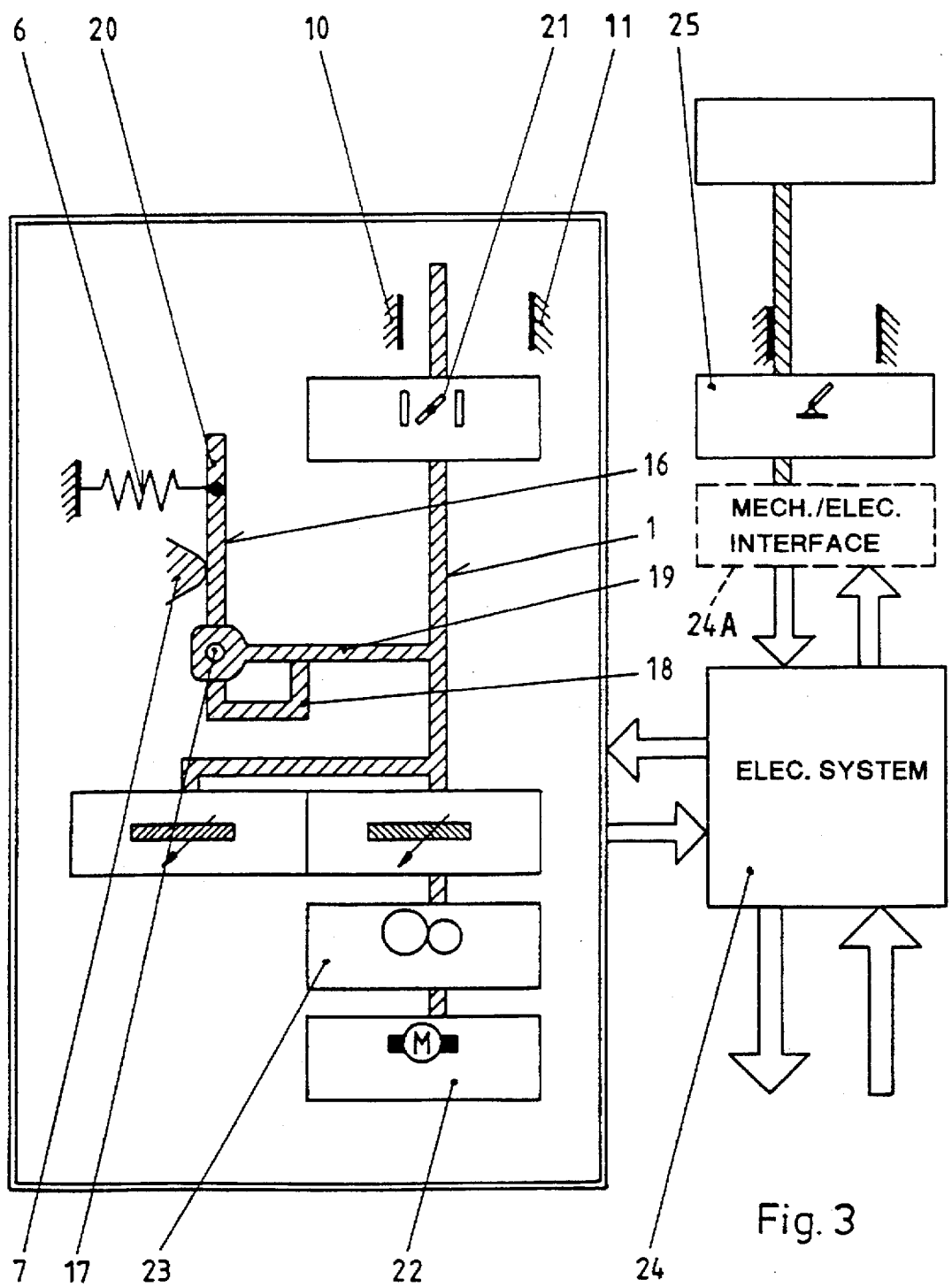
FIG. 3 is a basic sketch of a third embodiment of a load adjustment device in accordance with the invention.

In the embodiment shown in FIG. 3, a lever 16 is pivoted swingably around a pin 17 on the driver 1. The lever 16 is developed as an angle lever and lies with one lever arm 18 against a region 19 of the driver 1. The lever 16 is thereby prevented from swinging in counterclockwise direction.

The lever 16 has a lever arm 20 pointing upward in FIG. 3, on which lever arm the setting spring 6 which is developed as tension spring in this embodiment is fastened. This setting spring 6 urges the lever 16 to swing in counterclockwise direction. In the position shown it lies against the emergency travel stop 7.

The minimum load stop 10 and the full load stop 11 are shown in the upper region of the driver 1, and, below same, the throttle valve 21. Below the driver 1 there is diagrammatically indicated a servomotor 22 with a transmission 23 for the movement of the driver 1. An electronic system can furthermore be noted in FIG. 3, it receiving control commands, via a mechanical/electronic interface 24A, for controlling the servomotor 22 from an accelerator pedal 25.

If the driver 1 is moved to the right out of the emergency travel position shown, then the lever 16 follows in this movement and moves away from the emergency travel stop 7, whereby the setting spring 6 is increasingly tensioned and the driver 1 is pulled back again into the position shown as soon as the setting force no longer acts.

If the driver 1 is moved to the left from the emergency travel position shown into its minimum load position, then the lever 16 remains resting against the emergency travel stop 7. The desired setting movement is possible in the manner that the lever 16 swings in clockwise direction around the pin 17 of the driver 1.

Figure 4:
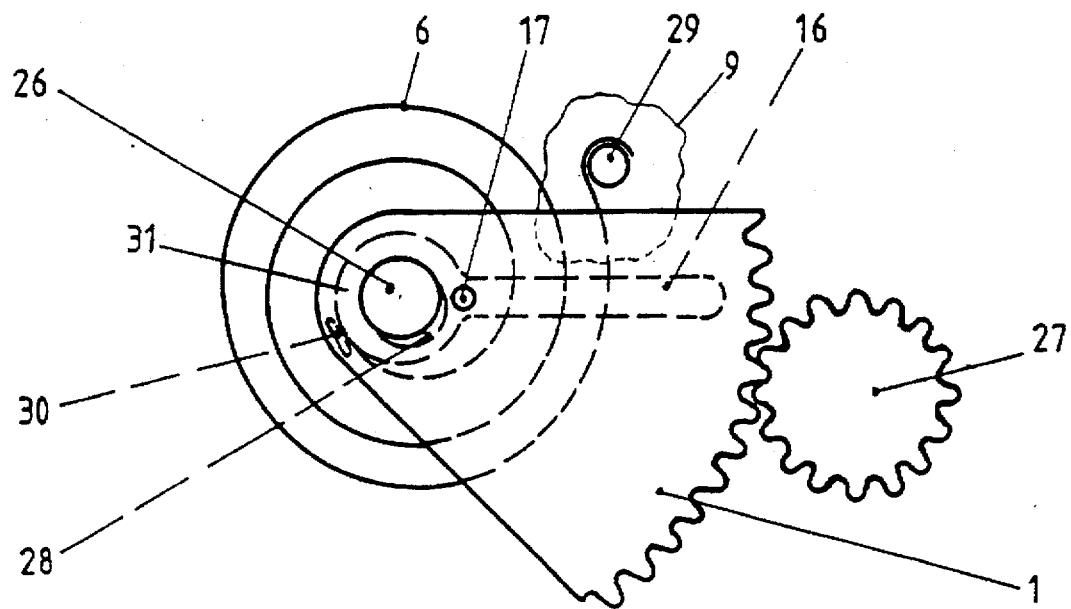
FIG. 4 is a plan view of a further embodiment of a load adjustment device.

FIG. 4 shows a setting shaft 26 on which a throttle valve (not shown in FIG. 4) is arranged. The driver 1, which in this embodiment is developed as a toothed segment, is connected, fixed for rotation, with the setting shaft 26. A pinion 27 meshes with toothing of the driver 1 in order to produce the setting movements of the setting shaft 26. Below the driver 1, as seen in FIG. 4, the lever 16 is arranged rotatably on the setting shaft 26. For this purpose it grips via a slot 28 over the setting shaft 26. The setting spring 6, in this embodiment, is developed as a spiral spring and has its one end fastened to a stop 29 fixed on the housing and its other end fastened to a projection 30 on the lever 16. The coupling between the lever 16 and the driver 1 is effected, as in the embodiment previously described, by the pin 17 which swingably connects the lever 16 to the driver 1.

When the driver 1 swings in clockwise direction, the lever 16 also swings in the corresponding direction, the setting spring 6 being increasingly tensioned. The setting spring 6 is thereby able to move the setting shaft 26 back into an emergency travel position, in which the lever 16 rests against the stop 29.

Figure 5:
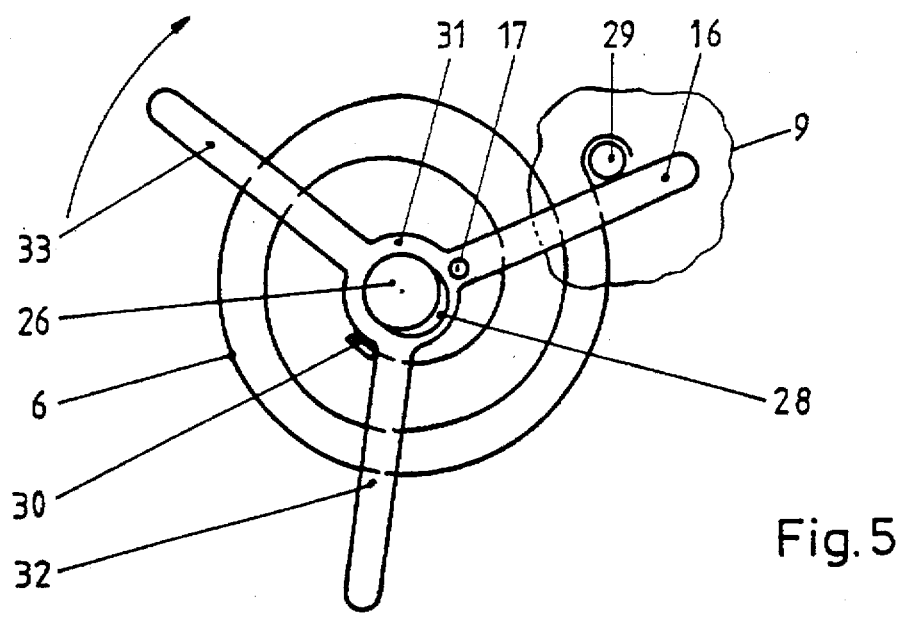
FIG. 5 is a plan view corresponding to FIG. 4 without the actuator.

FIG. 5 shows this emergency travel position without the driver 1. It can clearly be noted in FIG. 5 that the lever 16 surrounds the setting shaft 26 by a ring part 31 which forms the slot 28. The ring part 31 in this embodiment has two radially outwardly directed spring-cover arms 32, 33 which grip, in precisely the same manner as the lever 16, over the setting spring 6 and thereby secure the latter in its position.

If the setting shaft 26 is to be moved out of the emergency travel position in the direction towards the minimum load position, the pin 17 moves on an arcuate section around the center of the setting shaft 26. The lever 16 can, however, not readily follow along in this movement since its free end rests against the stop 29. However, since the lever 16 grips via the slot 28 over the setting shaft 26, it can swing around the pin 17 in such a manner that the ring part 31 moves radially outward on the setting shaft 26. The setting spring 6, developed as spiral spring, is in this case not tensioned in the direction of its turns but, rather, upon this movement acts as a torsion spring and urges the lever 16 back into the position shown in FIG. 5 and thus the setting shaft 26 into the emergency travel position.

Figure 6:
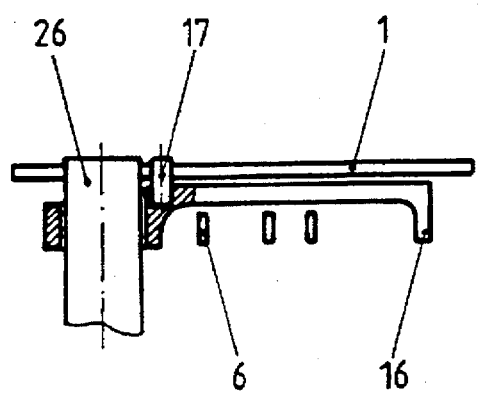
FIG. 6 is a vertical section through the load adjustment device of FIGS. 4 and 5.

FIG. 6 serves for the additional clarification of the development of the load adjustment device of FIGS. 4 and 5. In FIG. 6 there can be noted the setting shaft 26 with the driver 1 and, below it, the lever 16 which is connected by the pin 17 to the driver 1. Furthermore, the setting spring 6 developed as spiral spring can be noted in FIG. 6.

I claim:

1. A load adjustment device for an actuator which determines the power of an internal combustion engine, the device comprising:

a driver, two fixed stops defining a full load and a minimum load, and an actuator, the driver being coupled with the actuator and being displaceable between the two fixed stops defining the full load and the minimum load;

an emergency travel spring, an emergency travel stop and a return spring;

wherein the driver is urged by the emergency travel spring from a minimum-load position at the minimum load stop towards the emergency travel stop;

the emergency travel stop lies between the full load position at the full load stop and the minimum load position;

the driver is urged by the return spring from the full load position in a direction towards the minimum load position;

the return spring and the emergency travel spring constitute a single setting spring which is operated by movement of the driver from an emergency travel position in a direction of movement toward the full load position and in a direction of movement toward the minimum load position.

2. A load adjustment device for an actuator which determines the power of an internal combustion engine, the device comprising:

a driver, two fixed stops defining a full load and a minimum load, and an actuator, the driver being coupled with the actuator and being displaceable between the two fixed stops defining the full load and the minimum load;

an emergency travel spring, an emergency travel stop and a return spring;

wherein the driver is urged by the emergency travel spring from a minimum-load position at the minimum load stop towards the emergency travel stop;

the emergency travel stop lies between the full load position at the full load stop and the minimum load position;

the driver is urged by the return spring from the full load position in a direction towards the minimum load position;

the return spring and the emergency travel spring constitute a single setting spring which is operated by movement of the driver from an emergency travel position in a direction of movement toward the full load position and in a direction of movement toward the minimum load position;

the load adjustment device further comprises a first setting disk and a second setting disk, and a housing enclosing said driver;

wherein said driver has a first projection and a second projection;

said settings spring is a compression spring which spreads said first and said second setting disks apart from each other;

said first setting disk rests against said emergency travel stop;

said second setting disk rests, in its position furthest from the emergency travel stop, against said housing;

each of said setting disks has an inner side facing the other of said setting disks, and an outer side opposite said inner side; and for a displacement of each of said setting disks in directions towards the other of said setting disks, said driver grips respective ones of said first and said second setting disks with respective ones of said first and said second setting projections upon said outer sides of said setting disks.

3. A load adjustment device according to claim 2, further comprising a set screw for positioning said second setting disk; and wherein said second setting disk is located on a full-load side of said driver and rests against said housing in the emergency travel position, said second setting disk being positioned, in the region between the emergency travel position and the full load position, by said set screw.

4. A load adjustment device for an actuator which determines the power of an internal combustion engine, the device comprising:

a driver, two fixed stops defining a full load and a minimum load, and an actuator, the driver being coupled with the actuator and being displaceable between the two fixed stops defining the full load and the minimum load;

an emergency travel spring, an emergency travel stop and a return spring;

wherein the driver is urged by the emergency travel spring from a minimum-load position at the minimum load stop towards the emergency travel stop;

the emergency travel stop lies between the full load position at the full load stop and the minimum load position;

the driver is urged by the return spring from the full load position in a direction towards the minimum load position;

the return spring and the emergency travel spring constitute a single setting spring which is operated by movement of the driver from an emergency travel position in a direction of movement toward the full load position and in a direction of movement toward the minimum load position;

the load adjustment device further comprises a cable, a pulley, a stop part, and a housing stop;

wherein said setting spring serves to tension said cable which is passed over said pulley and extends to said driver, said setting spring urging said driver from said minimum load stop towards said emergency travel stop;

said emergency travel stop is provided on said stop part, said stop part resting from the full-load side against said housing stop; and said stop part carries said pulley and is displaceable in a direction towards the full load position by means of said driver.

5. A load adjustment device for an actuator which determines the power of an internal combustion engine, the device comprising:

a driver, two fixed stops defining a full load and a minimum load, and an actuator, the driver being coupled with the actuator and being displaceable between the two fixed stops defining the full load and the minimum load;

an emergency travel spring, an emergency travel stop and a return spring;

wherein the driver is urged by the emergency travel spring from a minimum-load position at the minimum load stop towards the emergency travel stop;

the emergency travel stop lies between the full load position at the full load stop and the minimum load position;

the driver is urged by the return spring from the full load position in a direction towards the minimum load position;

the return spring and the emergency travel spring constitute a single setting spring which is operated by movement of the driver from an emergency travel position in a direction of movement toward the full load position and in a direction of movement toward the minimum load position;

the load adjustment device further comprises a lever, a pin disposed on said driver, a lever arm; and wherein said lever is pivoted to driver around said pin;

said lever is urged by said setting spring in a direction towards said emergency travel stop, and is limited, by a resting of said lever arm against said driver, in a pivoting relative to the driver in the direction towards the emergency travel stop; and said lever rests in said emergency travel position simultaneously against said emergency travel stop and said driver.

6. A load adjustment device for an actuator which determines the power of an internal combustion engine, the device comprising:

a driver, two fixed stops defining a full load and a minimum load, and actuator, the driver being coupled with the actuator and being displaceable between the two fixed stops defining the full load and the minimum load;

an emergency travel spring, an emergency travel stop and a return spring;

wherein the driver is urged by the emergency travel spring from a minimum-load position at the minimum load stop towards the emergency travel stop;

the emergency travel stop lies between the full load position at the full load stop and the minimum load position;

the driver is urged by the return spring from the full load position in a direction towards the minimum load position;

the return spring and the emergency travel spring constitute a single setting spring which is operated by movement of the driver from an emergency travel position in a direction of movement toward the full load position and in a direction of movement toward the minimum load position;

the load adjustment device further comprises a housing enclosing said driver, a pin and a lever secured pivotally by the pin to said driver, and a further stop fixed to said housing;

wherein said setting spring is a spiral spring one end of which is fastened to said further stop and an opposite end of which is fastened on said driver, said lever resting in the emergency travel position against said further stop;

said load adjustment device further comprises a setting shaft, and said driver comprises a ring part with a slot therein;

wherein said ring part surrounds said setting shaft; and in said emergency travel position, said slot rests with one end thereof against said setting shaft, said slot being so directed that said ring part, after reaching the emergency travel position, upon further movement of said driver relative to said setting shaft, is able to move radially outward.

7. A load adjustment device according to claim 6, wherein said ring part has a plurality of spring-cover arms which grip over said setting spring.

* * * * *